Oct. 12, 1926.
W. F. ENNIS
FIXING MEANS FOR BOLTS
Filed July 13, 1922
1,603,003
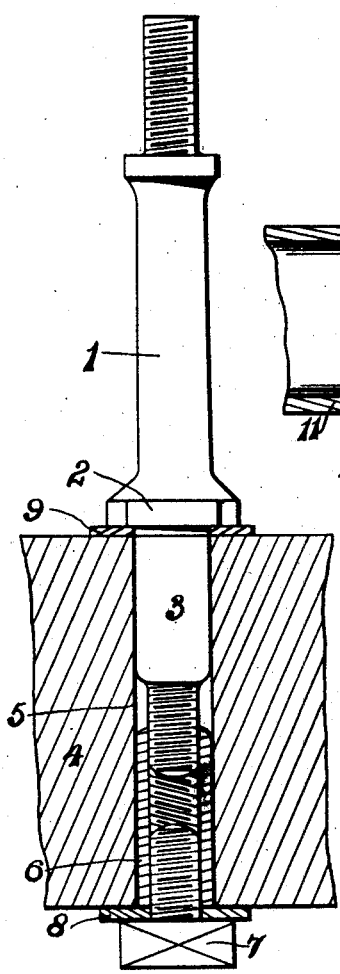
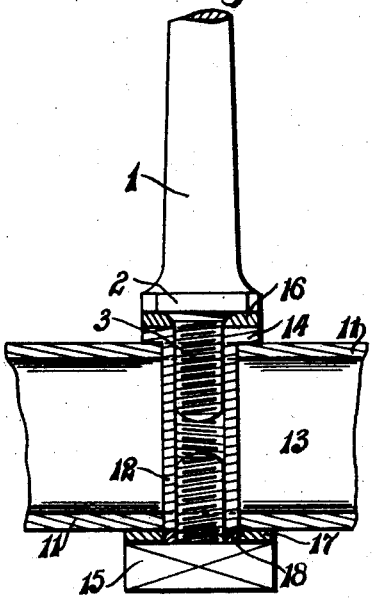
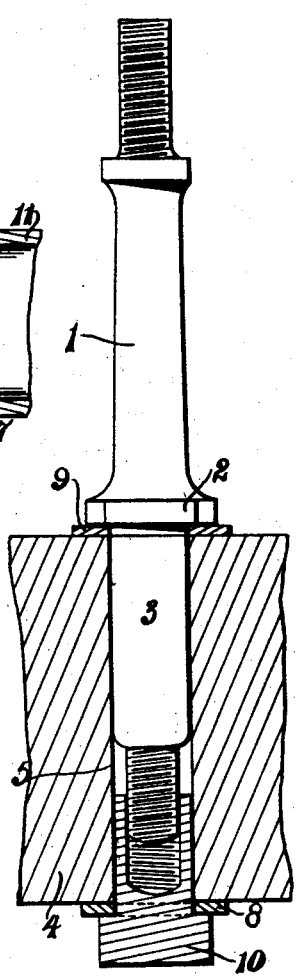
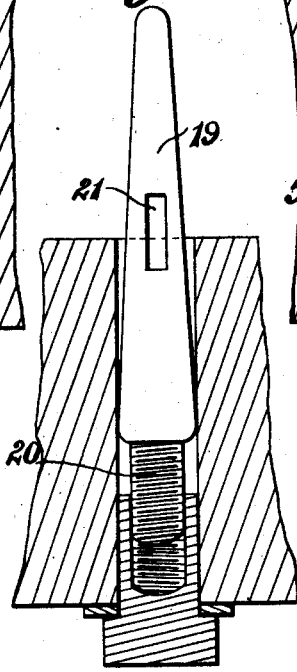
W. F. ENNIS
Inventor
per: Sydney E. Page
Attorney Patented Oct. 12, 1926.

1,603,003

UNITED STATES PATENT OFFICE.

WILLIAM F. ENNIS, OF CAIRO, EGYPT.

FIXING MEANS FOR BOLTS.

Application filed July 13, 1922, Serial No. 574,750, and in Great Britain September 1, 1921.

This invention relates to means for fixing bolts, particularly insulator bolts, that is, bolts having a head comprising an annular shoulder and a depending threaded stem. Such bolts are in general use for fixing insulators to the cross bars or arms of telephone or telegraph posts, the cross bar or other support being bored to receive the stem of the bolt which was long enough to protrude through the bore, the bolt being eventually clamped in position by engaging a nut over the end of the stem, which, with the flange of the bolt, co-operated to clamp the bolt in position; the nut being exposed to all climatic conditions, becomes rusted to the protruding end of the bolt and in a short time the bolt has to be thrown away as useless and a new bolt substituted. Further, in the generality of cases where it is required to change the bolt for another shape, the bolt which was in use owing to the exposed position of the connection between its fixing nut and its threaded stem, has become spoilt for further use.

The primary object of the present invention is to protect the threaded end of the bolt where it engages its retaining member from damp and eventual rust by locating the threaded end of the bolt and the fixing means within the bore of the support so that they can be removed after long periods of exposure in any type of climate, and if required, again used, and a further object is to construct the parts of the device so that they also can be removed and substituted if necessary.

In the accompanying drawings are shown, by way of example, three embodiments of the present invention, and in the drawings, like reference numerals designate the same or similar parts.

Fig. 1 being a part sectional elevation showing a means of fixing a bolt, wherein the socket is formed of a sleeve and a plug;

Fig. 2 showing in a similar view, the arrangement of fixing when a socket having an integral flange is employed;

Fig. 3 illustrating a method of fixing a straight bolt in an angle iron bar; and Fig. 4 illustrating the means employed for removing a socket when occasion arises.

Referring to these drawings, in Figs. 1, 2 and 3 a straight bolt is indicated by the numeral 1, the bolt comprising an annular flange 2 and a partially threaded stem 3.

First referring to Fig. 1, the bar to which the bolt is to be fixed is indicated by the numeral 4. This bar is bored at 5 to receive the stem 3 of the bolt, that is, the stem is shorter than the bore of the support and an internally threaded sleeve 6, which are of the same external diameter. Into the outer end of the sleeve 6 is projected a threaded plug 7 to close the end of the sleeve and to complete a housing for the stem 3, and this plug is provided with any suitably shaped head, for instance, square, by which it may be rotated by the use of a spanner, the head being of a diameter greater than the diameter of the bore. A washer 8, of compressible nature, for instance, leather or fibre, is placed over the plug 7 so that when the plug, which forms an end flange for the sleeve, is screwed into the sleeve the washer 8 is compressed by the head of the plug against the support and completely seals the joint between the plug and the sleeve and between the sleeve and the wall of the bore in the bar 4.

With these parts arranged, a washer 9, of similar nature to the washer 8, is placed over the stem 3 of the bolt, which then is introduced into the bore 5, into which it is rotated by means of a spanner engaged over the annular shoulder 2, until the threaded extremity of the stem 3 has so far engaged in the sleeve 6 that the shoulder 2 of the bolt has compressed the washer 9 against the face of the bar to a suitable degree, thereby sealing the other end of the bore 5.

In Fig. 2, the arrangement is similar with regard to the association of the washers, 8 and 9, but in the modification shown, the internally threaded sleeve member is formed at the outer end with an integral end flange and closure, as indicated by the numeral 10. Without further description, it will be obvious that by the rotation of the bolt when the stem is engaged in the internally threaded sleeve member, the latter will be drawn up into the bore while the bolt is drawn towards the socket, these movements compressing the washers 8 and 9 to the desired degree until the bore 5 in the bar is properly sealed.

In the construction shown in Fig. 3, the bar, which is of angle iron of channel section, has both its flanges 11 bored so that a sleeve, indicated by the numeral 12, can be inserted through the holes in both flanges and be retained in a position parallel with the web 13 of the angle iron. However, to prevent the sleeve falling through, I give it a flange indicated at 14. The sleeve, as in the other described constructions, is internally threaded to receive the stem 3 of the bolt, and a closed housing for the stem 3 is formed by plugging the outer end of the sleeve 12. In this case, a plug indicated by the numeral 15 is utilized. In order to form a seal between the annular shoulder 2 of the bolt and the flange 14 of the sleeve, I introduce over the stem 3 a compressible washer 16, which, when the bolt screws into the sleeve, seals the joint between the bolt flange and the sleeve. The outer end of the sleeve is sealed by interposing closely around the stem of the plug 15 a compressible washer 17, and around the opening in the washer placing a metal collar 18, so that when the plug 15 is screwed in the socket, the washer 17 is bulged out to seal the joint between the sleeve and the plug.

As an alternative method of sealing the lower end of the sleeve 12 shown in Fig. 3, a metal washer with the internal diameter equal to the external diameter of the sleeve 12 is placed over the stem of the plug 15 and between it and fitting tightly over the stem of the plug 15 would be placed a ring of compressible nature, so that when the plug 15 is screwed in the sleeve, the compressible ring would be pressed in close contact with the inside of the metal washer and the end of the sleeve 12.

In each of the constructions described with reference to the drawings, it will be noticed that the part 3 of the bolt is sealed within the bore 5 of the bar, or, in the case of the construction shown in Fig. 3, within the sleeve 12.

It should here be clearly understood that either method of forming the socket is available in every circumstance described, and that the particular embodiment shown in each application of the invention is by way of demonstration only and is not to be considered as limiting the use of either type of socket.

In order to disassociate the parts for substitution of other shaped bolts for the straight bolt shown in the drawings, it is merely necessary to unscrew the bolt, when it will be ready for further use, the stem having been protected against rust, instead of having to be cast away as has been usual when the bolts were fixed in the bar material by nuts external to the support. Further, should it be desired to remove the internally threaded sleeve members for any purpose, they can be merely forced out from the opposite end of the bore, and for this purpose, I should prefer to use a bolt headed punch, as shown in Fig. 4, which punch comprises a stem 19 and a threaded head 20 having suitable threads to engage in the threads of the sleeve member to be removed. Such a punch is introduced into the bore, and rotated by means of a key projected through the slot 21 in the stem of the bolt, until it is well engaged with the sleeve member. The punch is then driven through the bore to remove the sleeve member.

I am aware that it has heretofore been proposed to connect two rods, each comprising a head including an annular flange and a depending threaded stem by a sleeve internally threaded at each end to receive and thereby connect, the two said stems, and I make no claim to any such mere coupling arrangement, but—

I claim:—

1. A fixing for a bolt in a bored support exposed to climatic conditions, consisting in the combination with an annular flange on the bolt of a diameter greater than the bore in the support and a threaded stem to the bolt depending from said flange into said bore, of a sleeve fitting said bore internally threaded to receive the threaded bolt stem, a flanged closure for the outer end of said sleeve, the flange of said closure being of a greater diameter than that of the bore, a compressible washer around said closure and against its flange, and a compressible washer around said bolt stem and against its flange, whereby moisture is prevented from entering the threaded sleeve at either end and from gaining access to the threaded stem where it is in engagement with the sleeve.

2. The combination with an insulator bolt having a head including an annular flange and a depending threaded stem, of a support bored to a diameter less than the diameter of the annular flange to receive said threaded stem, a sleeve fitting said bore and internally threaded for engagement with the bolt stem, a flanged closure for the outer end of said sleeve, the flange of said closure being of greater diameter than that of the bore, a compressible washer around said closure and against its flange, and a compressible washer around said bolt stem and against the bolt flange.

In testimony whereof I affix my signature.

WILLIAM F. ENNIS.